United States Patent
Sakakibara et al.

(10) Patent No.: US 11,813,896 B2
(45) Date of Patent: Nov. 14, 2023

(54) TIRE

(71) Applicant: Sumitomo Rubber Industries, Ltd., Kobe (JP)

(72) Inventors: Yuta Sakakibara, Kobe (JP); Tomohiro Hamada, Kobe (JP); Tokuhito Nakajima, Kobe (JP); Sawa Ogihara, Kobe (JP); Suxiang Yuan, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 17/471,561

(22) Filed: Sep. 10, 2021

(65) Prior Publication Data

US 2022/0080780 A1 Mar. 17, 2022

(30) Foreign Application Priority Data

Sep. 14, 2020 (JP) .................. 2020-153820
Aug. 31, 2021 (JP) .................. 2021-141569

(51) Int. Cl.
*B60C 13/00* (2006.01)

(52) U.S. Cl.
CPC .................. *B60C 13/001* (2013.01)

(58) Field of Classification Search
CPC .............. B60C 13/02; B60C 13/001
See application file for complete search history.

(56) References Cited

U.S. PATENT DOCUMENTS

| D838,236 S | 1/2019 | Pierre et al. |
| 2016/0185163 A1 | 6/2016 | Muhlhoff et al. |
| 2018/0141390 A1* | 5/2018 | Miyasaka ............. B60C 13/001 |
| 2020/0062043 A1 | 2/2020 | Ishigaki et al. |

FOREIGN PATENT DOCUMENTS

| DE | 102016218487 A1 * | 3/2018 | .......... B60C 13/001 |
| JP | 11-321243 A | 11/1999 | |
| JP | 11321243 A * | 11/1999 | ............. B60C 13/02 |
| JP | 2000280716 A * | 10/2000 | |
| JP | 2020-29209 A | 2/2020 | |
| WO | WO 2016/005572 A2 | 1/2016 | |
| WO | WO 2016/005572 A3 | 1/2016 | |

OTHER PUBLICATIONS

Rittweger, English Machine Translation of DE 102016218487, 2018 (Year: 2018).*
Itabashi, English Machine Translation of JP H11321243, 1999 (Year: 1999).*
Kajikawa, English Machine Translation of JP 2000280716 A, 2000 (Year: 2000).*
Extended European Search Report for European Application No. 21195833.5, dated Feb. 1, 2022.

* cited by examiner

*Primary Examiner* — Justin R Fischer
*Assistant Examiner* — Brendon Charles Darby
(74) *Attorney, Agent, or Firm* — Birch, Stewart, Kolasch & Birch, LLP (57) ABSTRACT

A tire includes a visible outer surface being provided with a decorative region at least partially, the decorative region having 2 to 10 micro-protrusions per 1 mm². The micro-protrusions protrude in a tapered manner toward outwardly of the tire. The micro-protrusions include first protrusions having a first taper angle and a second protrusions having a second taper angle greater than the first taper angle.

20 Claims, 12 Drawing Sheets

TIRE

CROSS REFERENCE TO RELATED APPLICATION

This application claims the benefit of foreign priority to Japanese Patent Applications Nos. JP2020-153820, filed Sep. 14, 2020 and JP2021-141569, filed Aug. 31, 2021, which are incorporated by reference in its entirety.

BACKGROUND ART

Field of the Disclosure

The present disclosure relates to a tire.

Description of the Related Art

Patent Document 1 below discloses a tire including a decorative region being arranged a plurality of micro-protrusions. Each micro-protrusion is provided with a recess on the top surface. Such a recess can reduce the reflection of illuminated light and make the decorative region appear darker. This may improve the contrast between the decorative area and a non-decorative area adjacent to it, which may improve the visibility of the decorative region.

PATENT DOCUMENT

[Patent document 1] Japanese Unexamined Patent Application Publication 2020-29209

SUMMARY OF THE DISCLOSURE

In recent years, it has been desired to improve appearance performance of tires by making unevenness such as bulges, dents and bears formed on an outer surface of tires inconspicuous.

The present disclosure has been made in view of the above circumstances and has an object to provide tires capable of improving appearance performance.

In one aspect of the present disclosure, a tire includes a visible outer surface being provided with a decorative region at least partially, the decorative region having 2 to 10 micro-protrusions per 1 mm$^2$, the micro-protrusions protruding in a tapered manner toward outwardly of the tire, wherein the micro-protrusions include first protrusions having a first taper angle and a second protrusions having a second taper angle greater than the first taper angle.

DESCRIPTION OF THE PREFERRED EMBODIMENTS

An embodiment of the present disclosure will be explained below with reference to the accompanying drawings. Note that throughout the embodiments described below, the same elements are denoted by the same reference numerals and their detailed explanation is not be repeated.

Figure 1:
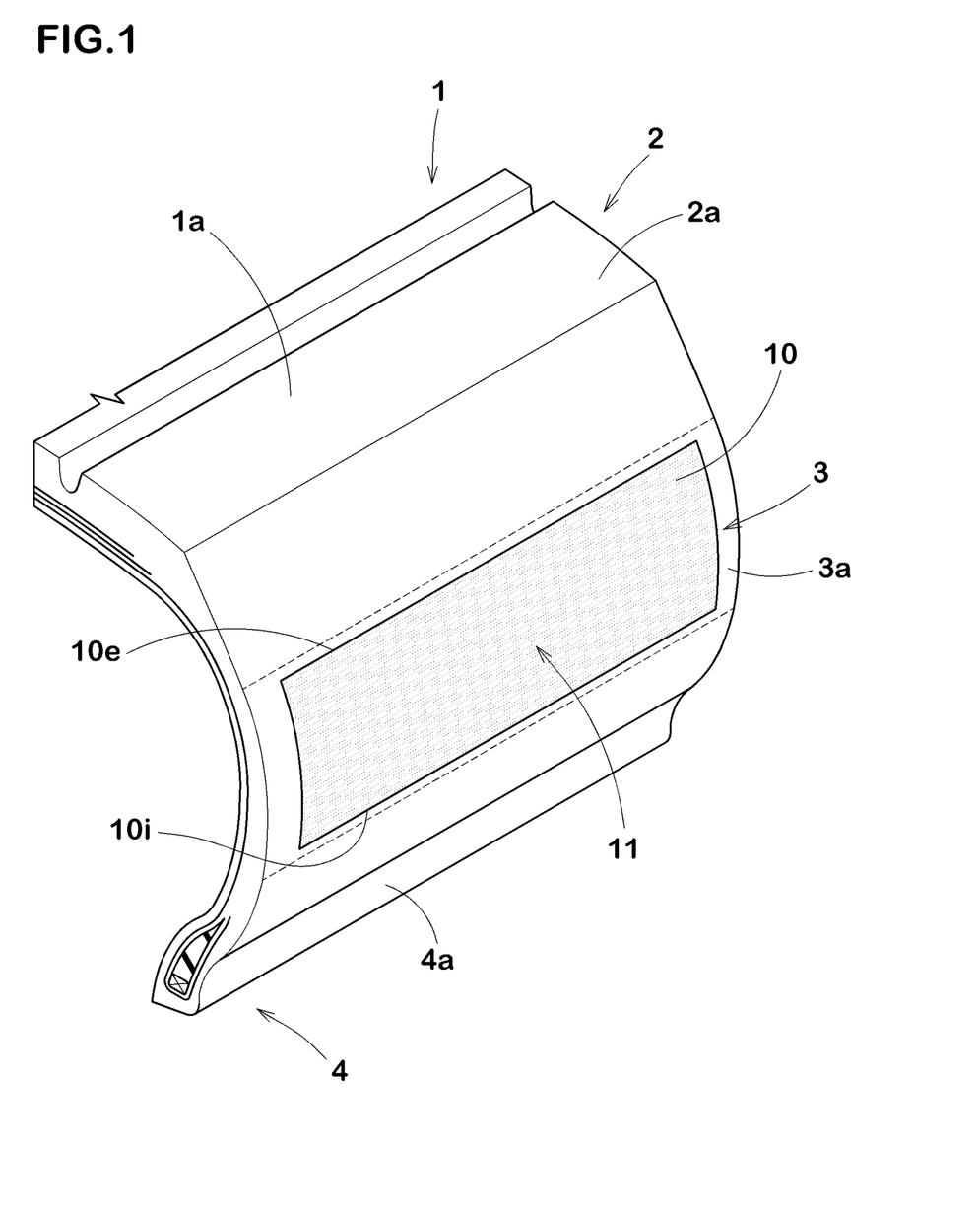
FIG. 1 is a partial perspective view of a tire in accordance with an embodiment of the present disclosure.

FIG. 1 is a partial perspective view of a tire 1 in accordance with an embodiment of the present disclosure. FIG. 1, as a preferred embodiment, illustrates a pneumatic tire 1 for passenger car. Alternatively, the present disclosure may be embodied as tires for motorcycles, heavy-duty vehicles, or other categories.

As illustrated in FIG. 1, the tire 1 according to the present embodiment includes a visible outer surface 1a. Here, "visible outer surface 1a" is the surface that can be seen from the outside when the tire 1 is mounted onto a wheel rim (not shown). The visible outer surface 1a includes, for example, the outer surface 2a of a tread portion 2, the outer surfaces 3a of sidewall portions 3, and the outer surface 4a of bead portions 4. The outer surface 1a of the present embodiment is formed in black with carbon black.

In the tire 1 according to the present embodiment, the visible outer surface 1a is provided with a decorative region 10 at least partially. The decorative region 10 according to the present embodiment is provided on the outer surface 3a of each or either one of the sidewall portions 3 at least partially. Note that the decorative region 10 is not limited to the one provided on the outer surface 3a of the sidewall portions 3, and may be provided on the outer surface 2a of the tread portion 2 or the outer surface 4a of the bead portions 4, for example.

The decorative region 10 according to the present embodiment expands in a circumferential band shape around the tire rotation axis (not shown). The decorative region 10 includes an outer edge 10e in the tire radial direction extending in the tire circumferential direction and an inner edge 10i in the radial direction extending in the tire circumferential direction. The decorative region 10 is not limited to such an aspect. For example, a plurality of decorative regions 10 may be provided in the tire circumferential direction.

The decorative region 10 according to the present embodiment has 2 to 10 micro-protrusions 11 per 1 mm$^2$. The micro-protrusions 11 protrude in a tapered manner toward outwardly of the tire. Such micro-protrusions 11 can suppress the reflection of incident light on the decorative region 10, thus increasing the degree of blackness in the decorative region 10. The number of the micro-protrusions 11 can be obtained as the number of the micro-protrusions 11 completely contained in the square area having a side of 5 mm in the plan view of the outer surface 1a divided by 25.

Figure 2:
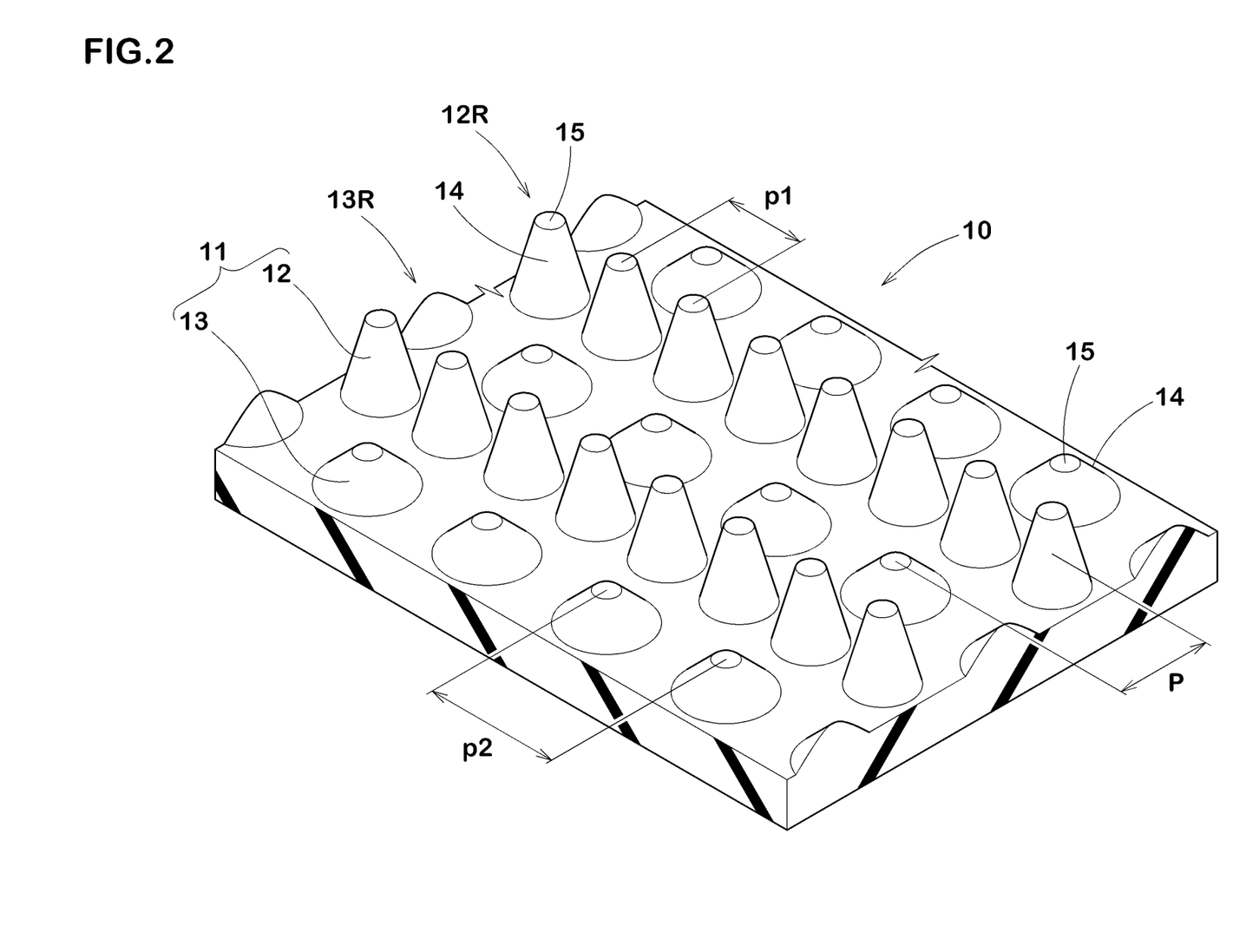
FIG. 2 is an enlarged view of a decorative region of FIG. 1.
Figure 3A:
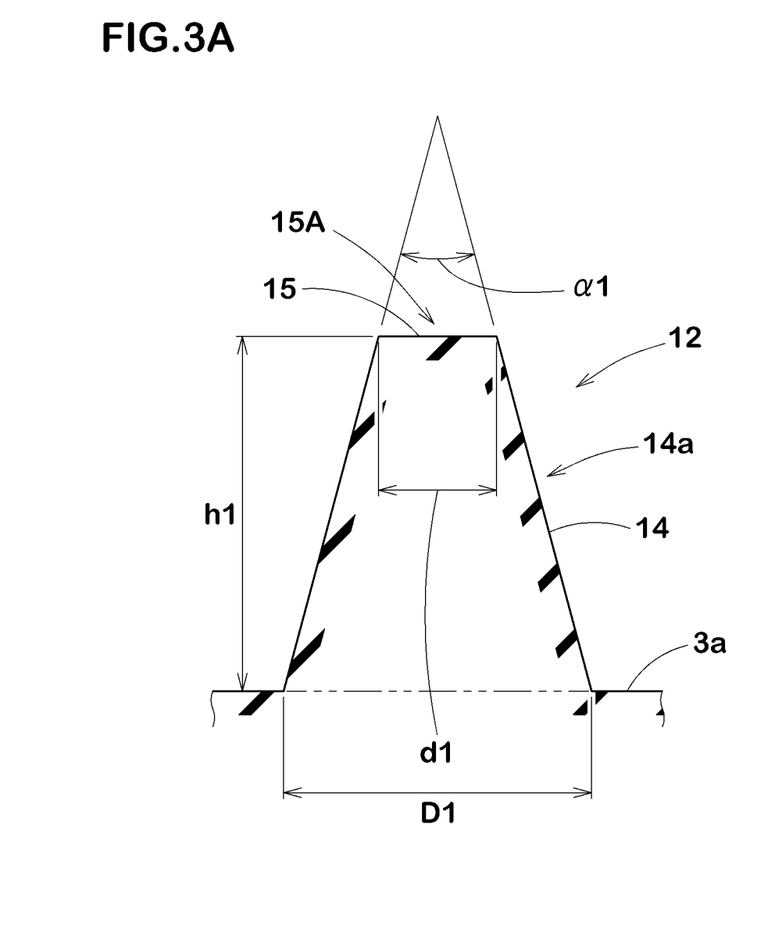
FIG. 3A is a cross-sectional view of a first protrusion.
Figure 3B:
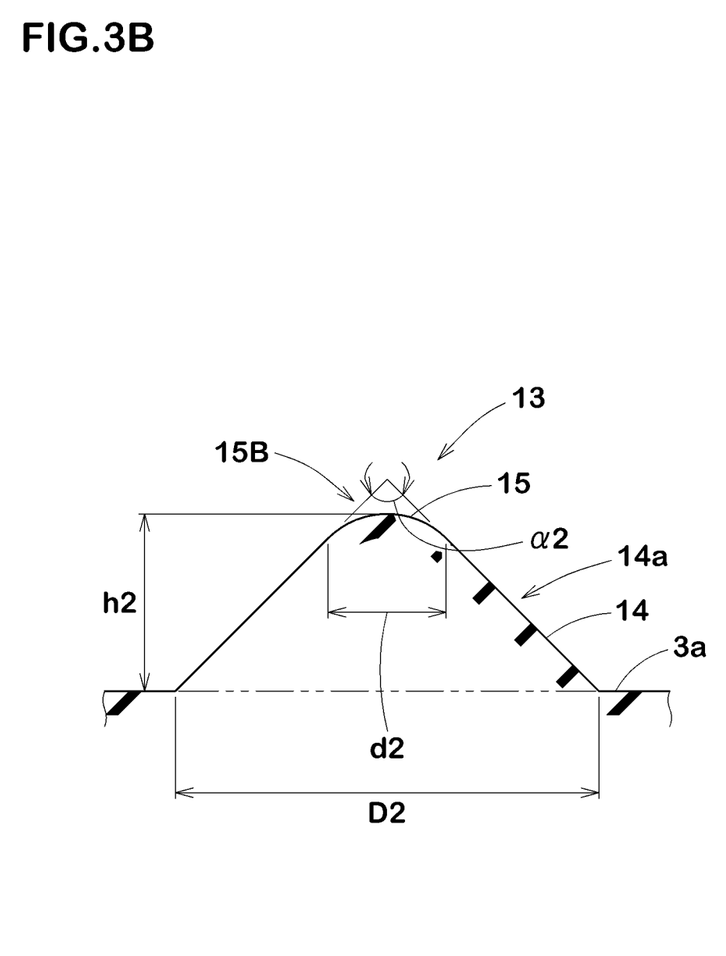
FIG. 3B is a cross-sectional view of a second protrusion.

FIG. 2 is an enlarged view of a decorative region 10 of FIG. 1. FIG. 3A is a cross-sectional view of a first protrusion, and FIG. 3B is a cross-sectional view of a second protrusion. As illustrated in FIG. 2, FIG. 3A and FIG. 3B, the micro-protrusions 11 include first protrusions 12 having a first taper angle and a second protrusions 13 having a second taper angle greater than the first taper angle. The first protrusions 12 can reflect the incident light inwardly of the tire while absorbing it to provide a high degree of blackness. The second protrusions 13 can reflect the incident light to outwardly of the tire, causing unevenness in blackness with the first protrusions 12. Thus, in the tire 1 according to the present embodiment, the contrast between light and dark occurs in the decorative region 10, which can provide excellent appearance performance. In addition, even if a bulge, dent or the like occurs in the sidewall portion 3, the contrast between light and dark, for example, makes it inconspicuous and further enhances the appearance performance.

When the first taper angle α1 of the first protrusions 12 becomes small, rubber chipping may occur, and appearance performance may deteriorate. When the first taper angle α1 of the first protrusions 12 becomes large, incident light may be easily reflected to outwardly of the tire. From these viewpoints, the first taper angle α1 is preferably equal to or more than 10 degrees, more preferably equal to or more than 20 degrees, still further preferably equal to or more than 30 degrees, but preferably equal to or less than 100 degrees, more preferably equal to or less than 90 degrees, still further preferably equal to or less than 80 degrees.

When the second taper angle α2 of the second protrusions 13 becomes small, the contrast (difference between light and dark) with respect to the first protrusions 12 may be small. When the second taper angle α2 of the second protrusions 13 becomes large, the incident light may be excessively reflected to the outside of the tire, and the blackness of the decorative region 10 may be reduced. From these viewpoints, the second taper angle α2 is preferably equal to or more than 30 degrees, more preferably equal to or more than 40 degrees, still further preferably equal to or more than 50 degrees, but preferably equal to or less than 120 degrees, more preferably equal to or less than 110 degrees, still further preferably equal to or less than 100 degrees.

Preferably, the difference (α2−α1) between the second taper angle α2 of the second protrusions 13 and the first taper angle α1 of the first protrusions 12 is in a range of from 10 to 90 degrees. This may enhance the blackness and makes the contrast clear. In order to exert such an effect effectively, the difference (α2−α1) is more preferably equal to or more than 30 degrees, more preferably equal to or less than 60 degrees.

The first protrusions 12 have a first protrusion height h1, and the second protrusions have a second protrusion height h2. Preferably, the first protrusion height h1 is greater than the second protrusion height h2. As a result, the incident light reflected outwardly by the second protrusions 13 may hit the first protrusions 12 and be absorbed, resulting in a higher degree of blackness. When the first protrusion height h1 of the first protrusions 12 becomes excessively greater than the second protrusion height h2 of the second protrusions 13, the first protrusions 12 may be too conspicuous and appearance performance may deteriorate. From this viewpoint, the first protrusion height h1 of the first protrusions 12 is preferably equal to or more than 1.4 times the second protrusion height h2 of the second protrusions 13, more preferably equal to or more than 2.0 times, still further preferably equal to or more than 2.5 times, but preferably equal to or less than 5.0 times, more preferably equal to or less than 4.5 times, still further preferably equal to or less than 4.0 times. In order to further exert the above effect effectively, the first protrusion height h1 of the first protrusions 12 is preferably equal to or more than 0.1 mm, more preferably equal to or more than 0.2 mm, still further preferably equal to or more than 0.3 mm, but preferably equal to or less than 0.8 mm, more preferably equal to or less than 0.7 mm, still further preferably equal to or less than 0.6 mm.

In the present embodiment, the micro-protrusions 11 each include a base portion 14 extending outwardly of the tire in a tapered manner, and a top portion 15 connected to the base portion 14 and extending from the base portion 14 outwardly with a gentle inclination with respect to the base portion 14. In this embodiment, the base portion 14 includes an inclined surface 14a formed in a straight line in a vertical cross-sectional view of the micro-protrusion 11. The base portion 14 may include, for example, a surface formed in a convex arc shape on the outer side of the tire, and/or may include a surface formed in a concave arc shape on the inner side of the tire (not illustrated). As used herein, the first taper angle α1 of the first protrusions 12 and the second taper angle α2 of the second protrusions 13 mean an average angle at the base portion 14. The top portion 15 is a portion formed with a taper angle exceeding 120 degrees.

In the present embodiment, both first protrusions 12 and second protrusions 13 are formed into a truncated cone shape. Such base portions 14 may absorb incident light while reflecting it toward outwardly of the tire in multiple directions. The truncated cone shape includes not only a circular bottom but also an elliptical truncated cone. Note that the base portions 14 are not limited to such an embodiment, and may be a pyramid base, for example.

In the present embodiment, the first protrusions 12 each have a top portion 15A which has a flat surface. Such a top portion 15A can reflect incident light outwardly of the tire. Thus, the unevenness of blackness is further increased, and appearance performance can further be improved. The top portion 15A of each first protrusion 12 is a circular plane. The top portion 15A, as a whole, may be formed into a flat surface. Alternatively, the top portion 15A may include a flat surface and a peripheral curved surface that surrounds the flat surface to connect the flat surface with the base portion 14 smoothly.

In the present embodiment, the second protrusion 13 each have a top portion 15B which has a hemispherical surface convex outwardly of the tire. Such a top portion 15B can scatter incident light and may illuminate one or more first protrusions 12. The incident light irradiated with the first protrusions 12 may be absorbed by the first protrusions 12, and thus the blackness of the decorative region 10 may be enhanced. Therefore, appearance performance of the tire can be improved further. As used herein, "hemispherical" means not only a half of sphere but also either one of two parts of a sphere divided by a plane passing through a location other than the center of the sphere.

Preferably, a maximum diameter d1 of the top portions 15A of some or all first protrusion 12 is the same as a maximum diameter d2 of the top portions 15B of some or all second protrusions 13. As a result, the difference between the amount of light reflected by the top portions 15A of some first protrusions 12 and the amount of light reflected by the top portions 15B of some second protrusions 13 is small, and the contrast between light and dark is maintained higher.

Preferably, the maximum diameter d1 of the top portions 15A of the first protrusions 12 and the maximum diameter d2 of the top portions 15B of the second protrusions 13 are equal to or more than 0.05 mm, more preferably equal to or more than 0.1 mm, but preferably equal to or less than 0.4 mm, more preferably equal to or less than 0.3 mm. When the maximum diameter d1 and the maximum diameter d2 are equal to or more than 0.05, it is possible to increase the unevenness of the blackness due to the reflected light of each the top portion 15. When the maximum diameter d1 and the maximum diameter d2 are equal to or less than 0.4 mm, the blackness can further be ensured.

Preferably, a maximum diameter D1 of the first protrusions 12 is smaller than a maximum diameter D2 of the second protrusions 13. As a result, the area of the base portion 14 of each second protrusion 13 becomes relatively large, and the unevenness of blackness may increase. The maximum diameters D1 and D2 are formed at the innermost positions of the protrusions 12 and 13, respectively.

When the maximum diameter D1 of the first protrusions 12 becomes excessively small with respect to the maximum diameter D2 of the second protrusions 13, the degree of blackness may decrease. Thus, the ratio (D2/D1) of the maximum diameter D2 of the second protrusions 13 to the maximum diameter D1 of the first protrusions 12 is preferably equal to or more than 1.1, more preferably equal to or more than 1.2, but preferably equal to or less than 2.0, more preferably equal to or less than 1.7.

Figure 4:
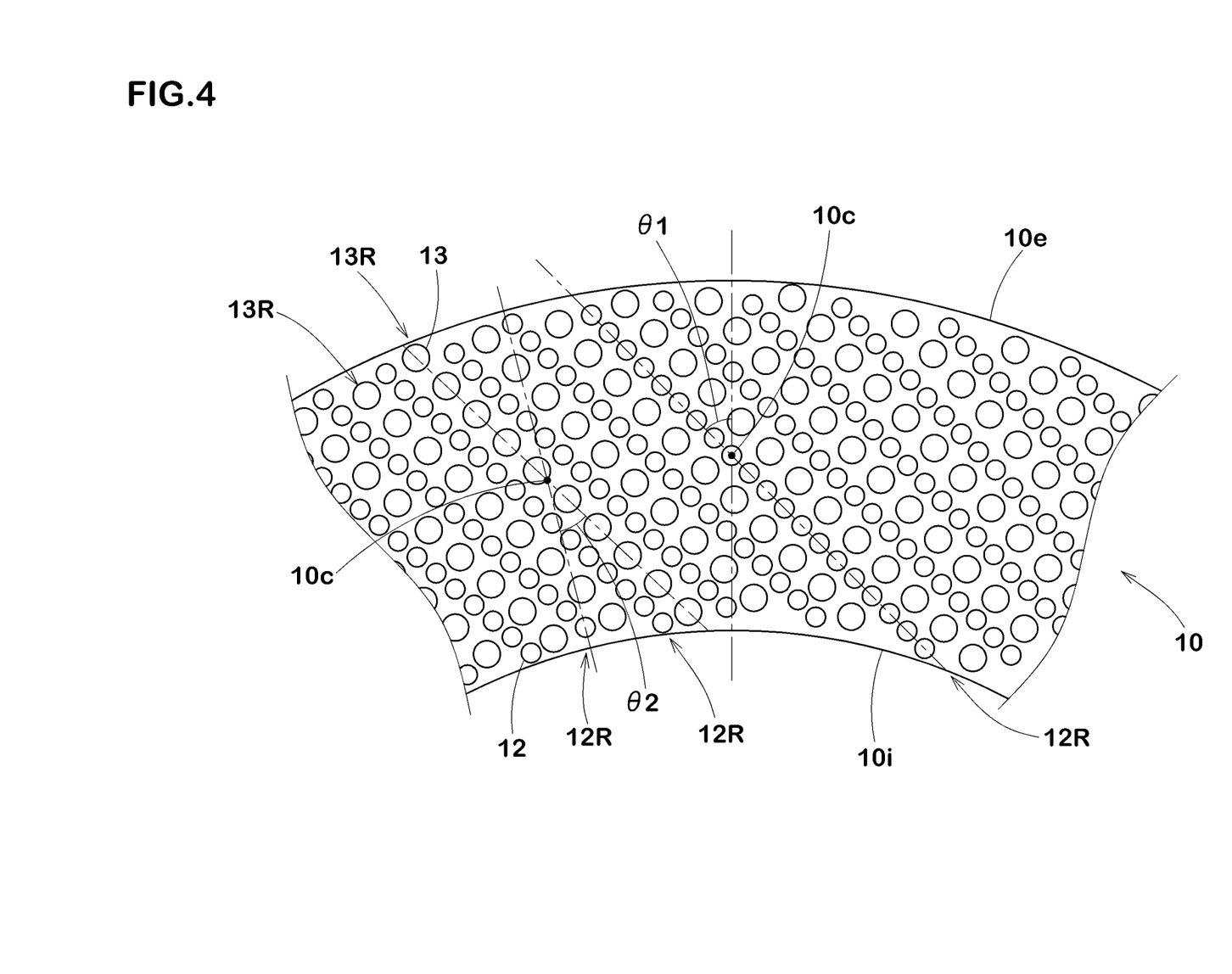
FIG. 4 is an enlarged front view of the decorative region of FIG. 1.

FIG. 4 is a front view of the decorative region 10 of FIG. 1. As illustrated in FIG. 4, the decorative region 10 according to the present embodiment includes one or more first protrusion groups 12R where the first protrusions 12 are arranged consecutively. In the first protrusion groups 12R, the incident light is reflected by the adjacent first protrusions 12 with each other while being absorbed their surfaces, so that the blackness can further be increased.

Further, the decorative region 10 includes one or more second protrusion groups 13R where the second protrusions 13 are arranged consecutively. Such second protrusion groups 13R may increase the unevenness of blackness between adjacent the second protrusions 13.

Furthermore, in the decorative region 10, for example, the first protrusion groups 12R and the second protrusion groups 13R are arranged alternately. Thus, the above-mentioned effect can be improved, so that the contrast between light and dark is emphasized and the effect of making bulges, dents inconspicuous can further be exhibited. In the present embodiment, the first protrusion groups 12R and the second protrusions group 13R are arranged alternately in the tire circumferential direction.

Preferably, an angle θ1 of an arrangement direction of the first protrusion groups 12R is equal to or more than 30 degrees with respect to the tire radial direction, more preferably equal to or more than 35 degrees, still further preferably equal to or more than 40 degrees, but preferably equal to or less than 60 degrees, more preferably equal to or less than 55 degrees, still further preferably equal to or less than 50 degrees. When the angle θ1 of the first protrusion groups 12R is in a range of 30 to 60 degrees, the visibility of the decorative region 10 can be improved, and appearance performance of the tire can be improved. From a similar point of view, an angle θ2 of an arrangement direction of the second protrusion groups 13R is preferably equal to or more than 30 degrees, more preferably equal to or more than 35 degrees, still further preferably equal to or more than 40 degrees, but preferably equal to or less than 60 degrees, more preferably equal to or less than 55 degrees, still further preferably equal to or less than 50 degrees. Preferably, the angle θ1 of the first protrusion groups 12R are equal to the angle θ2 of the second protrusion groups 13R. The angle θ1 of the first protrusion groups 12R and the angle θ2 of the second protrusion groups 13R are measured at the center location 10c in the tire radial direction between the outer edge 10e and the inner edge 10i of the decorative region 10.

In the present embodiment, the total number of the first protrusions 12 is greater than the total number of the second protrusions 13. As a result, the effect of improving the blackness by the first protrusions 12 may be greatly exhibited. When the total number of the first protrusions 12 becomes excessively large with respect to the total number of the second protrusions 13, the unevenness of blackness may decrease. Thus, the total number of first protrusions 12 is preferably equal to or more than 1.2 times the total number of the second protrusions 13, more preferably equal to or more than 1.4 times, still further preferably equal to or more than 1.6 times, but preferably equal to or less than 2.5 times, more preferably equal to or less than 2.2 times, still further preferably equal to or less than 2.0 times.

As illustrated in FIG. 2, a ratio (p1/D1) of an arrangement pitch p1 of the first protrusions 12 to the maximum diameter D1 (shown in FIG. 3) of the first protrusions 12 is preferably equal to or more than 1.05, more preferably equal to or more than 1.15, but preferably equal to or less than 1.40, more preferably equal to or less than 1.30.

Preferably, a ratio (p2/D2) of an arrangement pitch p2 of the second protrusions 13 to the maximum diameter D2 of the second protrusions 13 is greater than the ratio (p1/D1) of the first protrusions 12. Thus, the effect of increasing the blackness and the effect of exerting the unevenness of the blackness may be enhanced in a well-balanced manner, bulges, dents etc. can be made more inconspicuous. From this viewpoint, the ratio (p2/D2) of the second protrusions 13 is preferably equal to or more than 1.35, more preferably equal to or more than 1.45, but preferably or equal to or less than 1.65, more preferably equal to or less than 1.55.

Preferably, an arrangement pitch P between the adjacent first protrusion groups 12R and the second protrusion groups 13R is equal to or more than 1.6 times of the maximum diameter D1 of the first protrusions 12, more preferably equal to or more than 1.7 times, but preferably equal to or less than 2.0 times, more preferably equal to or less than 1.9 times. When the arrangement pitch P is equal to or more than 1.6 times of the maximum diameter of the first protrusions 12, the contrast is emphasized because the unevenness of light and darkness due to the top portions 15A and 15B of each of the protrusions 12 and 13 may be clearly visible. When the arrangement pitch P is equal to or less than 2.0 times of the maximum diameter D1 of the first protrusions 12, the light reflected by the second protrusions 13 may be effectively absorbed by the first protrusions 12.

Figure 5:
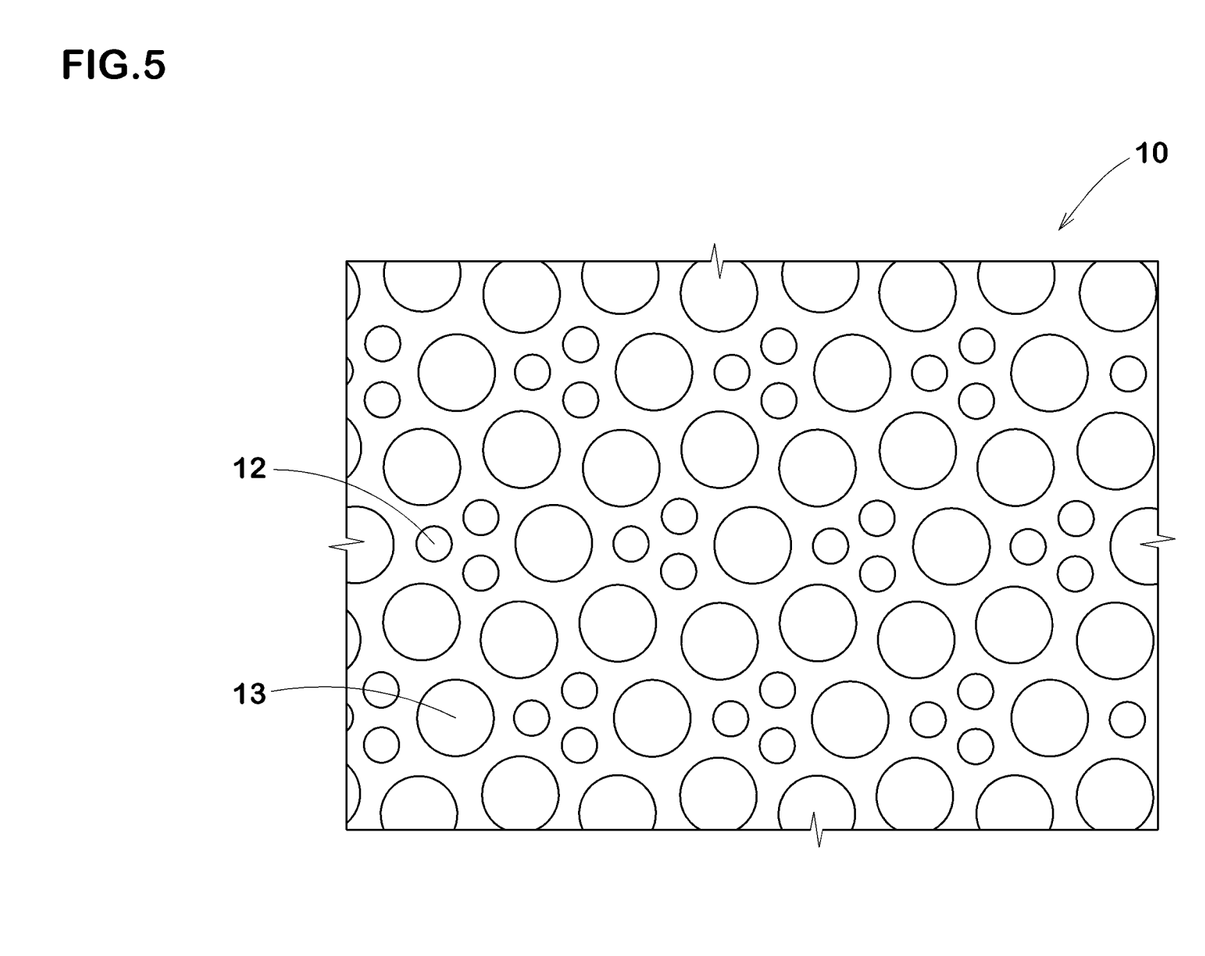
FIG. 5 is an enlarged front view of the decorative region in accordance with another embodiment.

FIG. 5 is an enlarged front view of the decorative region 10 in accordance with another embodiment. As illustrated in FIG. 5, the decorative region 10, in this embodiment, includes one or more decorative patterns where a plurality of second protrusions 13 is arranged so as to surround a plurality of first protrusions 12. In this embodiment, the decorative region 10, for example, includes some decorative patterns each of which includes six second protrusions 13 surrounding three first protrusions 12.

Figure 6:
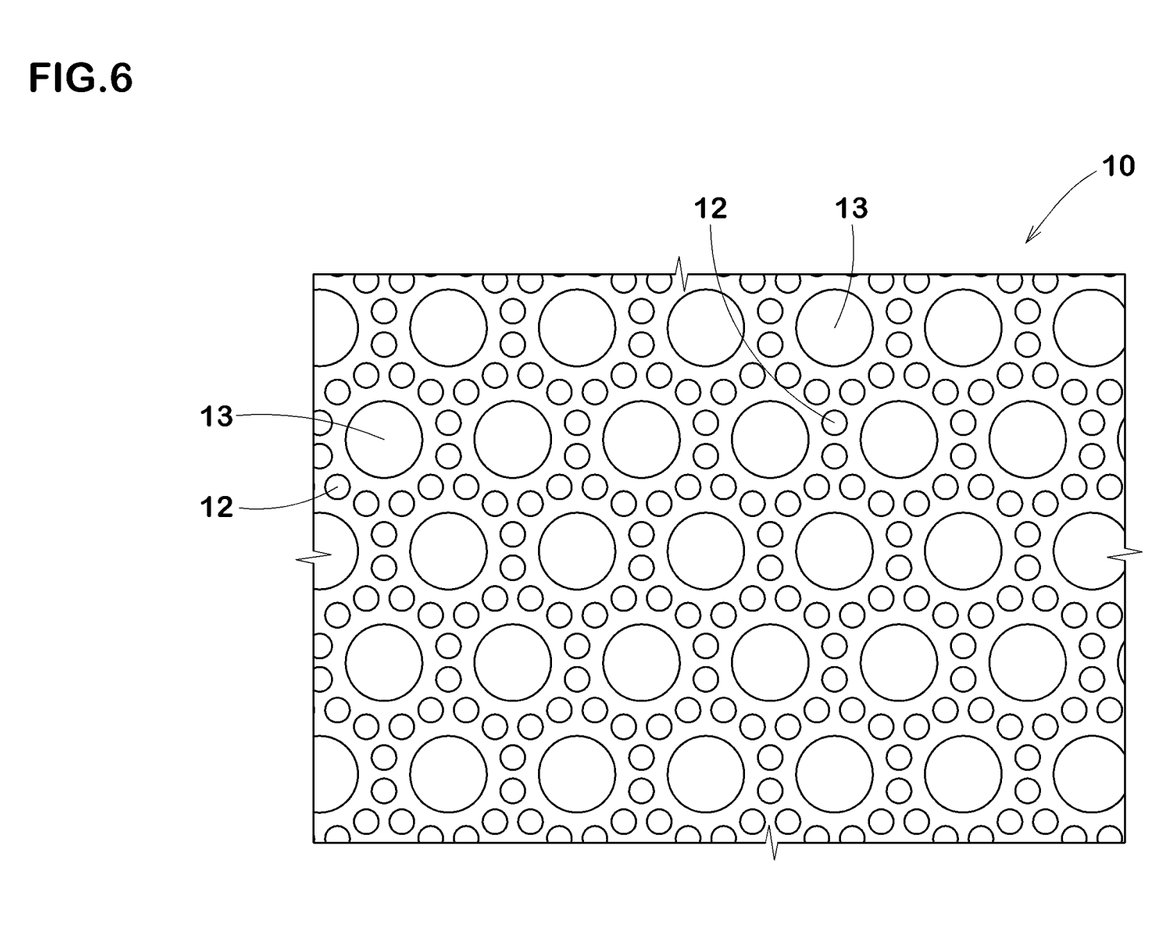
FIG. 6 is an enlarged front view of the decorative region in accordance with yet another embodiment.

FIG. 6 is an enlarged view of the decorative region 10 in accordance with yet another embodiment. As illustrated in FIG. 6, the decorative region 10, in this embodiment, includes one or more decorative patterns where a plurality of first protrusions 12 is arranged so as to surround one of the second protrusions 13. In this embodiment, the decorative region 10, for example, includes some decorative patterns each of which includes twelve first protrusions 12 surrounding a single second protrusions 13.

Hereinafter, yet other embodiments of the present disclosure will be described. Note that the details and explanation of the above elements can be applied to the same elements described below.

Figure 7:
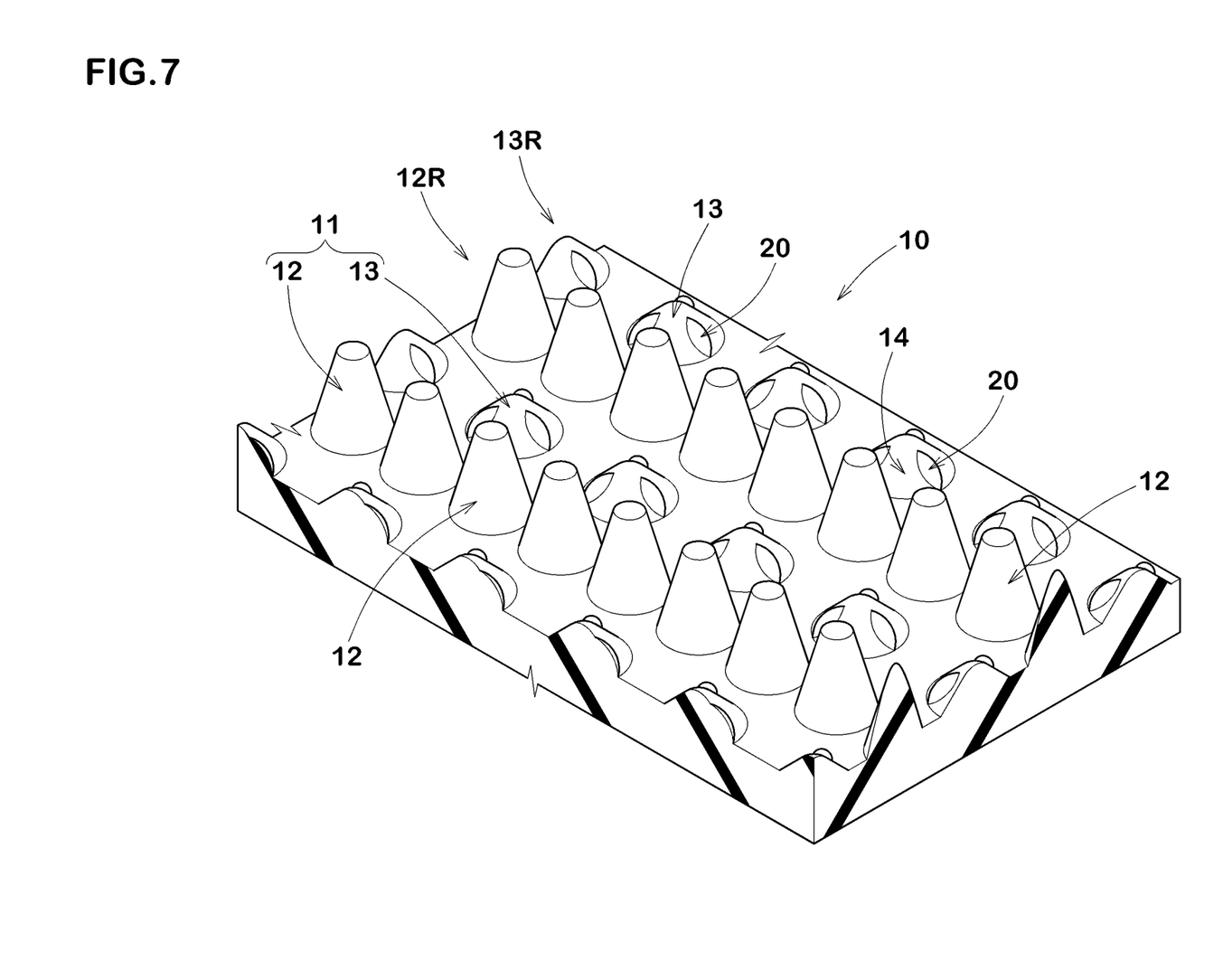
FIG. 7 is an enlarged view of the decorative region in accordance with yet another embodiment.

FIG. 7 is an enlarged view of the decorative region 10 in accordance with yet another embodiment. As illustrated in FIG. 7, in this embodiment, the first protrusions 12 have substantially the same structure as described above. On the other hand, the second protrusions 13 are different from the structure as described above.

Figure 8:
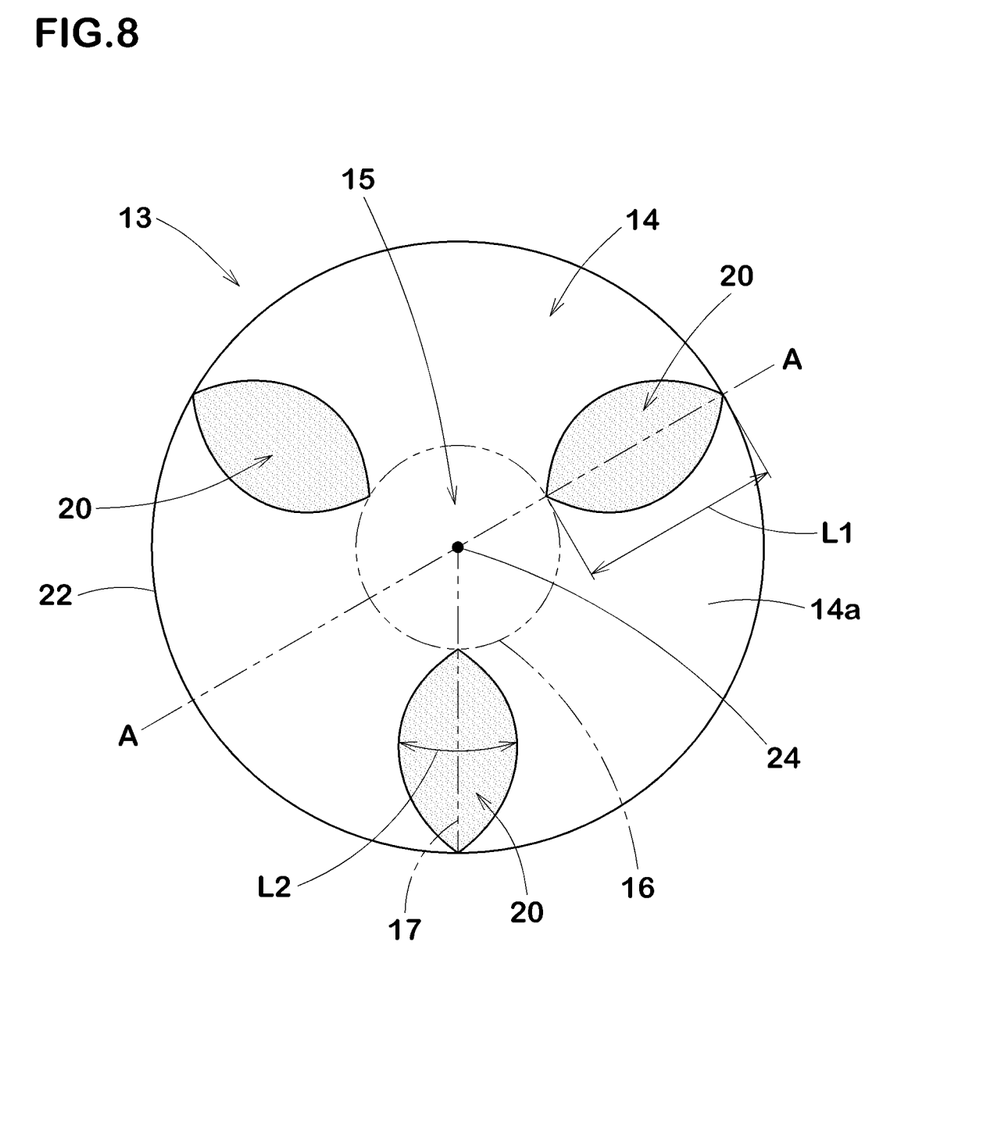
FIG. 8 is a plan view viewed from above of a second protrusion shown in FIG. 7.
Figure 9:
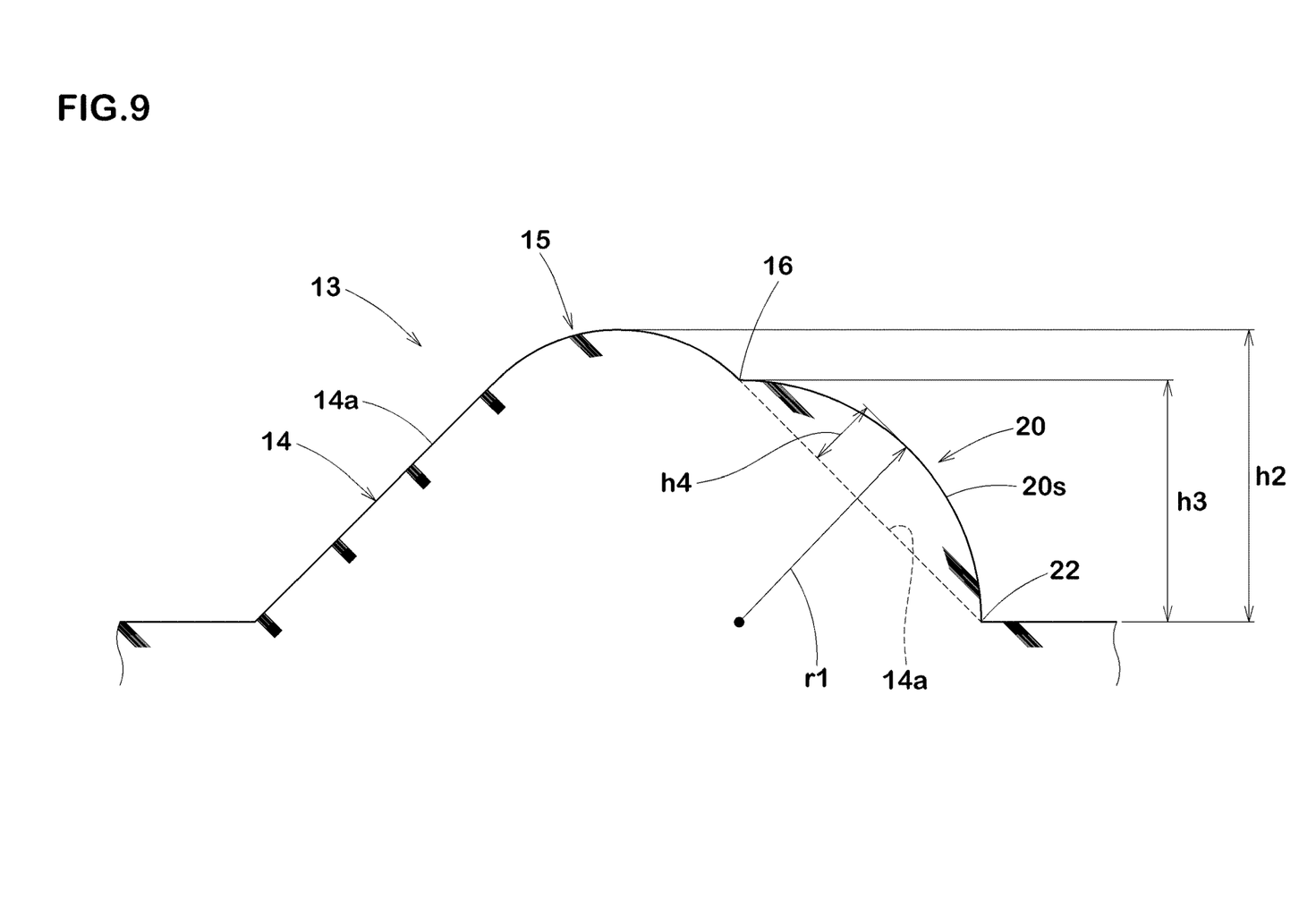
FIG. 9 is a cross-sectional view taken along the line A-A of FIG. 8.

FIG. 8 is a plan view viewed from above of one of the second protrusions 13 shown in FIG. 7. FIG. 9 is a cross-sectional view taken along the line A-A of FIG. 8. As illustrated in FIG. 8 and FIG. 9, in this embodiment, the second protrusions 13 each includes the base portion 14 extending outwardly of the tire in a tapered manner. The base portion 14 includes the inclined surface 14a defining the second taper angle and at least one bump 20 protruding from the inclined surface 14a. The second protrusions 13 with bumps 20 can disperse the incident light in a more complicated manner, and can be expected to absorb the scattered light. Thus, the blackness of the second protrusions 13 may be enhanced, and the contrast between light and dark with the first protrusions 12 can be further increased. In order to make it easier to understand the structure, dots are added to the bumps 20 in FIG. 8.

As illustrated in FIG. 8, the second protrusions 13 according to this embodiment each include a plurality of bumps 20. The number of the bumps 20 contained in each second protrusion 13 is, for example, in a range of 2 to 6, preferably 2 to 4. In some more preferred embodiments, the bottom edge 22 of each second protrusion 13 is formed in a circular shape in a top view, and a plurality of bumps 20 is arranged at equal intervals in the circumferential direction of the bottom edge 22. This feature may further improve the blackness of the second protrusions 13.

Preferably, each bump 20, for example, is configured to elongate along a generating line 17 (for ease of understanding, it is shown by a two-dot chain line in FIG. 8) of the inclined surface 14a. That is, a length L1 of each bump 20 in a direction of the generating line 17 is larger than a length L2 of the bump 20 in the circumferential direction. Specifically, the length L1 may be 1.5 to 3.5 times of the length L2. In some more preferred embodiments, each second protrusion 13 includes the base portion with the inclined surface 14a extending in a tapered manner and the top portion 15 having a hemispherical surface convex outwardly of the tire, wherein one or more bumps 20 extend from a boundary 16 between the base portion 14 and the top portion 15 to the bottom edge 22 of the second protrusion 13. Note the boundary 16 is shown by a two-dot chain line in FIG. 8. As a result, the contrast between the first protrusions 12 and the second protrusions 13 becomes even greater, and appearance performance of the tire can be improved further.

As illustrated in FIG. 9, in a cross-sectional view of the second protrusion 13 passing either bump 20, the outer surface 20s of the bump 20, for example, is preferably curved in an arc shape that is convex outwardly of the tire. Preferably, a radius of curvature r1 of the outer surface 20s of each bump 20, for example, is in a range of from 80% to 120% of a height h3 from the bottom edge 22 of the second protrusion 13 to the boundary 16 between the base portion 14 and the top portion 15. Thus, the above-mentioned effects can be exhibited while suppressing molding defects of the bumps 20 during vulcanization molding.

From the same viewpoints, in the above-mentioned cross-sectional view shown in FIG. 9, a height h4 of each bump 20 from the inclined surface 14a to the outer surface of the bump 20 located farthest from the inclined surface 14a is preferably in a range of from 20% to 30% of the second height h2 of the second protrusion 13.

Figure 10:
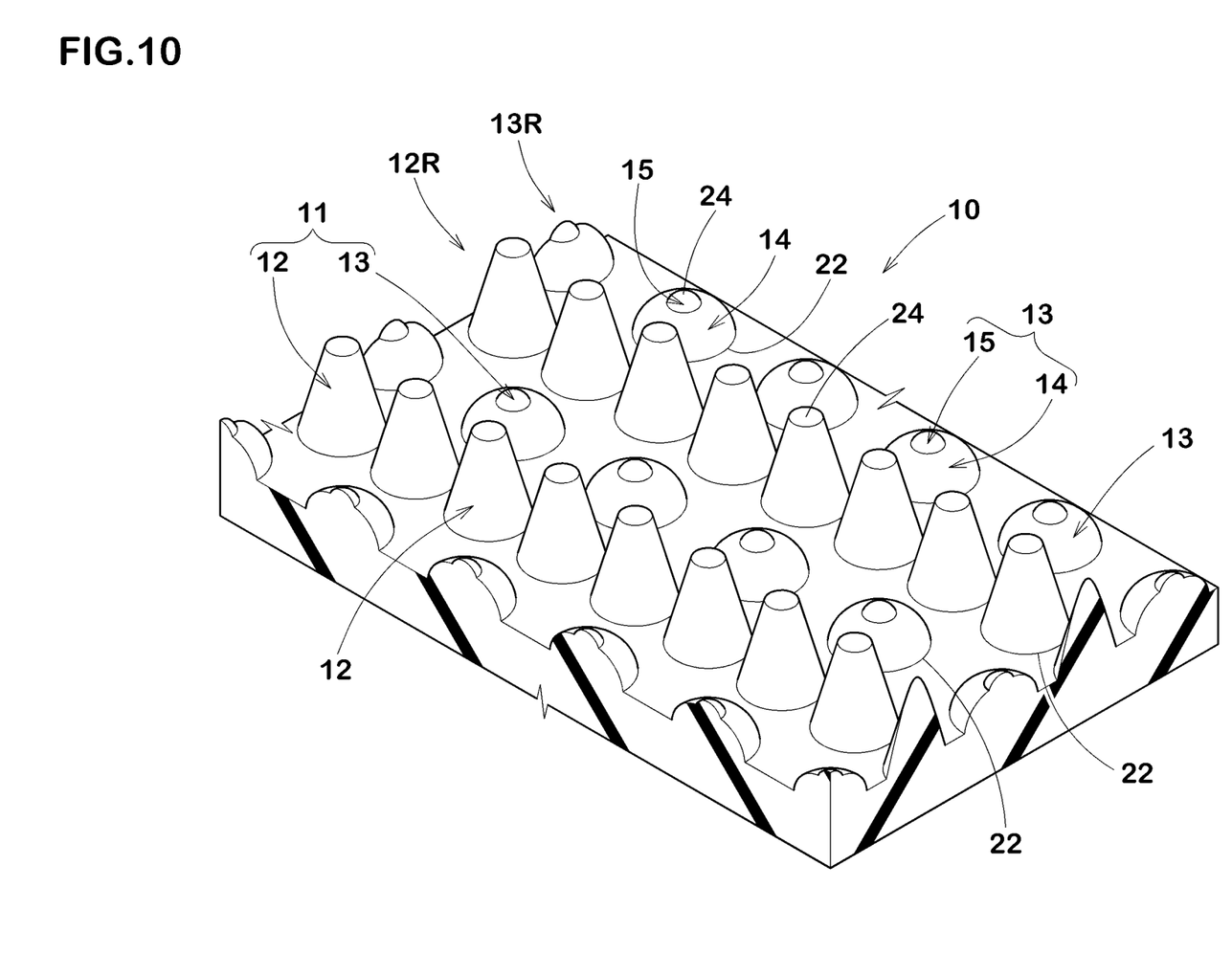
FIG. 10 is an enlarged view of the decorative region in accordance with yet another embodiment.

FIG. 10 is an enlarged view of the decorative region 10 in accordance with yet another embodiment. As illustrated in FIG. 10, the micro-protrusions 11 each have the circularly extending bottom edge 22, a bottom area surrounded by the bottom edge 22 in a top view of the micro-protrusion, an apex 24 at the position farthest from the bottom edge 22, and a protrusion height from the bottom edge 22 to the apex 24. Further, the micro-protrusions 11 include the first protrusions 12 having a first bottom area and a first protrusion height h1, and the second protrusions having a second bottom area and a second protruding height h2.

Figure 11A:
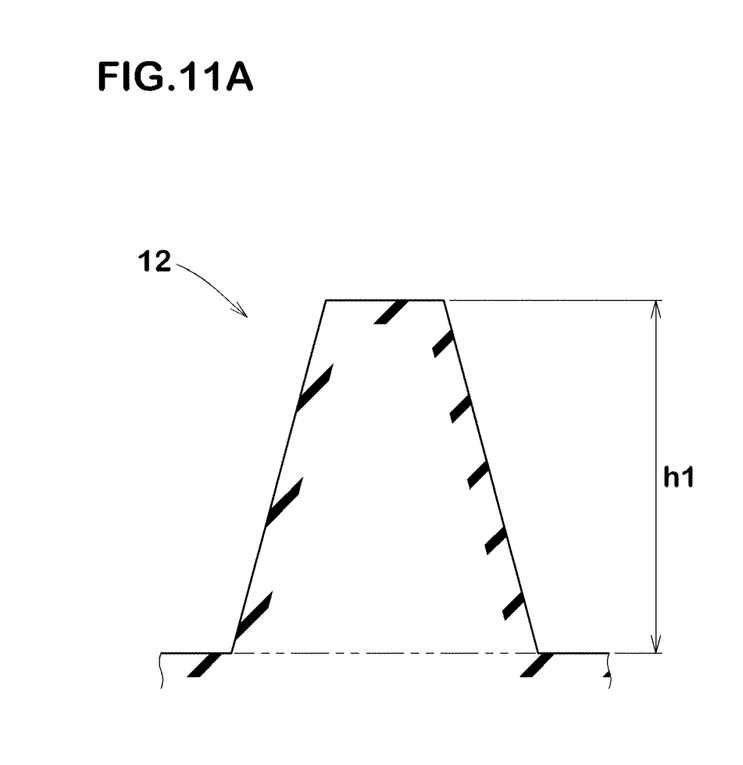
FIG. 11A is a cross-sectional view of one of the first protrusions shown in FIG. 10.
Figure 11B:
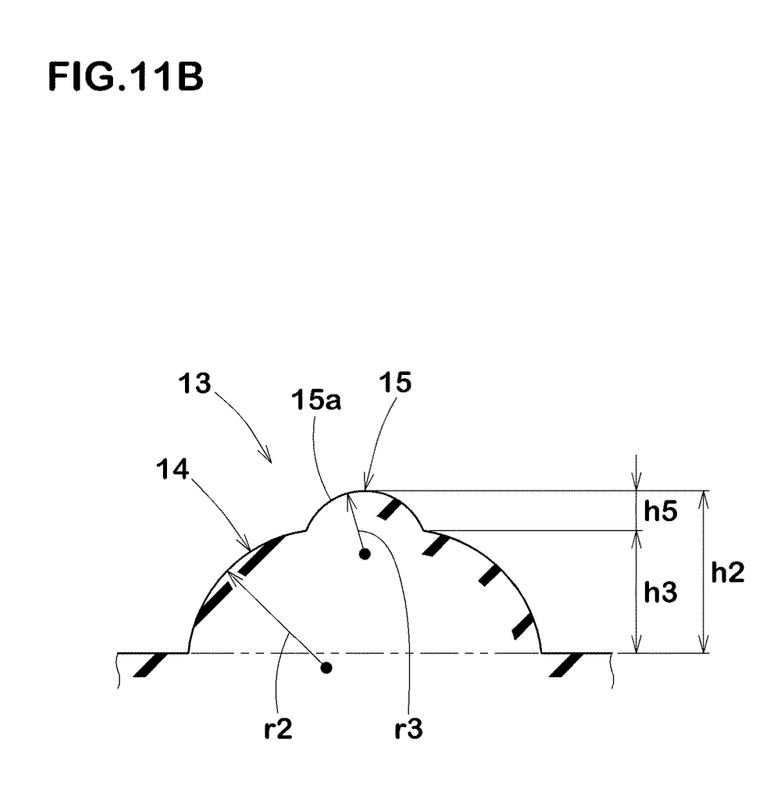
FIG. 11B is a cross-sectional view of one of the second protrusions shown in FIG. 10.

FIG. 11A is a cross-sectional view of one of the first protrusions 12 shown in FIG. 10. FIG. 11B is a cross-sectional view of one of the second protrusions 13 shown in FIG. 10. As illustrated in FIGS. 11A and 11B, in this embodiment, the second bottom area of the second protrusions 13 is greater than the first bottom area of the first protrusions 12. In addition, the second protrusion height h2 of the second protrusions 13 is smaller than the first protrusion height h1 of the first protrusions 12. The decorative region 10 with such first protrusions 12 and second protrusions 13 can provide the contrast between light and dark, providing excellent appearance performance.

In view of making the contrast of the decorative region 10 strong while suppressing molding defects during tire vulcanization process, the first protrusion height h1 of the first protrusions 12 is preferably equal to or more than 1.4 times the second protrusion height h2 of the second protrusions 13, more preferably equal to or more than 2.0 times, still further preferably equal to or more than 2.5 times, but preferably equal to or less than 5.0 times, more preferably equal to or less than 4.5 times, still further preferably equal to or less than 4.0 times. In addition, the second bottom area of the second protrusions 13 is preferably equal to or more than 1.1 times of the first bottom area of the first protrusions 12, more preferably equal to or more than 1.3 times, but preferably equal to or less than 2.5 times, more preferably equal to or less than 2.2 times of the first protrusions 12.

In this embodiment, the first protrusions 12 have substantially the same structure as described above. On the other hand, the second protrusions 13 are different from the structure as described above.

As illustrated in FIG. 10, the second protrusions 13 according to the present embodiment each include the base portion 14 extending outwardly of the tire from the bottom edge 22 and having a dome-shaped outer surface, and the top portion 15 protruding further from the outer surface of the base portion 14. Such second protrusions 13 can further enhance the contrast between light and dark with the first protrusions 12, and can further enhance appearance performance of the tire. The dome-shaped outer surface means a surface that is convex and curved toward outwardly of the tire.

As illustrated in FIG. 11B, a height h3 of the base portion 14 of each second protrusion 13, for example, is preferably in a range of from 65% to 85% of the second protrusion height h2 of the second protrusions 13. In this embodiment, the outer surface of the base portion 14 of each second protrusion 13, in a cross-sectional view including the apex of the second protrusion 13, is curved in an arc shape manner convex to outwardly of the tire. In addition, in the cross-sectional view, a radius of curvature r2 of the outer surface of the base portion 14, for example, is preferably in a range of 100% to 150% of the height h3 of the base portion 14, and is preferably equal to or less than 1.0 mm. Such second protrusions 13 can increase the blackness while suppressing molding defects during vulcanization process.

Preferably, the top portion 15 of each second protrusion 13, for example, has a dome-shaped outer surface protruding further from the base portion 14. Thus, the outer surface 15a of the top portion 15 of each second protrusion 13, in the cross-section shown in FIG. 11B, is curved in an arc shape manner convex to outwardly of the tire. Further, a radius of curvature r3 of the outer surface 15a of the top portion 15 of each second protrusion 13 is smaller than the radius of curvature r2 of the base portion 14. Specifically, the radius of curvature r3 is preferably in a range of from 30% to 60% of the radius of curvature r2. Furthermore, a height h5 of the top portion 15, for example, is preferably in a range of from 20% to 30% the second protrusion height h2 of the second protrusion 13. This may further improve the blackness of the second protrusions 13.

The configuration of the second protrusions 13 is not limited to the above aspects. The second protrusions 13, for example, may include the base portion 14 having a dome-shaped outer surface and the top portion 15 having a substantially flat outer surface (not illustrated).

Figure 12:
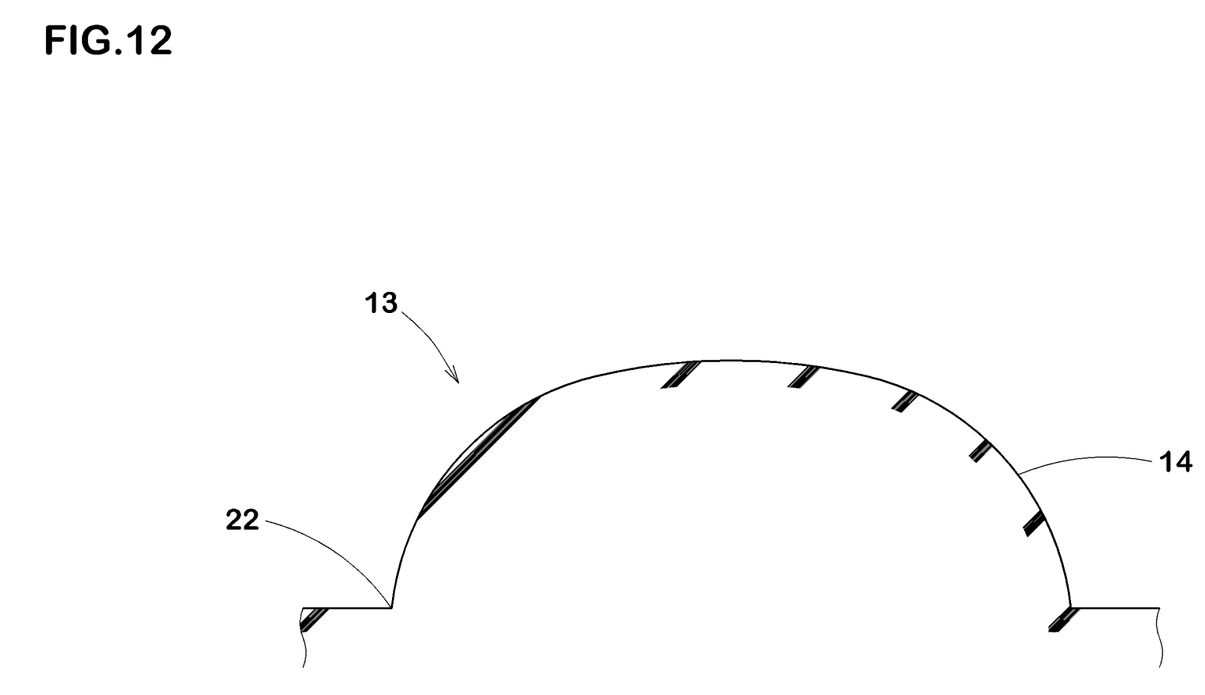
FIG. 12 is a cross-sectional view of the second protrusion in accordance with yet another embodiment.

FIG. 12 illustrates a cross-sectional view of one of the second protrusion 13 in accordance with yet another embodiment. As illustrated in FIG. 12, the second protrusions 13, as a whole, each consist of the base portion 14 extending outwardly of the tire from the bottom edge 22 and having a dome-shaped outer surface. As a result, the above-mentioned effects can be expected while suppressing molding defects during vulcanization process.

The decorative regions 10 according to the embodiments shown in FIG. 7 and FIG. 10 include the first protrusion groups 12R where the first protrusions 12 are arranged consecutively, and the second protrusion groups 13R where the second protrusions 13 are arranged consecutively. The first protrusion groups 12R and the second protrusion groups 13R, for example, are arranged alternately in the tire circumferential direction.

The first protrusions 12 and the second protrusions 13 shown in FIG. 7 and FIG. 10 may be arranged in various aspects, for example, where theses may be arranged in accordance with the aspects shown in FIGS. 5 to 6. That is, in the decorative region having the first protrusions 12 and the second protrusions 13 shown in FIG. 7 and FIG. 10, a plurality of second protrusions 13 may be arranged so as to surround a plurality of first protrusions 12 As illustrated in FIG. 5. Further, in the decorative region having the first protrusions 12 and the second protrusions 13 shown in FIG. 7 and FIG. 10, a plurality of first protrusions 12 may be arranged so as to surround a single second protrusion 13 as shown in FIG. 6. With such decorative region 10, further improvement in appearance performance can be expected.

While the particularly preferable embodiments in accordance with the present disclosure have been described in detail, the present disclosure is not limited to the illustrated embodiments, but can be modified and carried out in various aspects within the scope of the claims.

Example

In order to confirm the effects of the present disclosure, pneumatic tires having the decorative region as shown in FIG. 1 and FIG. 2 on the outer surface of the sidewall portions were prototyped. Then, appearance performance of each prototype tire was tested. The specifications other than those listed in Table 1 are substantially the same among the comparative examples and the examples.

Maximum diameter D1 of first protrusions: 0.4 mm
First protrusion height h1 of first protrusions: 0.4 mm
Arrangement pitch p1 of first protrusions: 0.5 mm
Arrangement pitch p2 of second protrusions: 0.7 mm
Arrangement pitch P between first protrusion groups and second protrusion groups: 0.9 mm
Angles θ1 and θ2 of arrangement direction: 45 degrees Appearance Performance Test:

An inspector visually observed each prototype tire from the side one meter away, and sensually evaluated the appearance performance based on the inconspicuousness of bulges and dents due to the contrast of the decorative region. The results are shown using a score of 10 for Example 1. The larger the value, the less noticeable the bulges and dents, etc., and the better the appearance performance. Table 1 shows the test results.

TABLE 1

|  | Ref. 1 | Ref. 2 | Ex. 1 | Ex. 2 | Ex. 3 | Ex. 4 | Ex. 5 | Ex. 6 | Ex. 7 | Ex. 8 |
| --- | --- | --- | --- | --- | --- | --- | --- | --- | --- | --- |
| α1 (deg.) | 30 | 60 | 30 | 30 | 30 | 30 | 30 | 30 | 30 | 30 |
| α2 (deg.) | 30 | 60 | 90 | 160 | 140 | 60 | 90 | 90 | 90 | 90 |
| h1/h2 | 2 | 2 | 2 | 2 | 2 | 2 | 1.3 | 1.4 | 5 | 5.1 |
| Appearance performance [score] | 3 | 3 | 10 | 8 | 9 | 9 | 8 | 9 | 9 | 7 |

It is confirmed that the tires of the examples are superior in appearance performance to the tires of the comparative examples.

Pneumatic tires having the decorative region shown in FIG. 7 or FIG. 10 on the outer surface of the sidewall portions were prototyped and the above-mentioned appearance performance was tested. Table 2 shows the test results.

TABLE 2

|  | Ex. 9 | Ex. 10 |
| --- | --- | --- |
| Figure showing decorative region | FIG. 7 | FIG. 10 |
| Appearance performance [score] | 10 | 10 |

As shown in Table 2, it was confirmed that the embodiments shown in FIG. 7 and FIG. 10 also have excellent appearance performance as in the embodiments shown in FIG. 2.

[Clause]

The disclosure includes the following aspects.

[Clause 1]

A tire comprising:
a visible outer surface being provided with a decorative region at least partially,
the decorative region having 2 to 10 micro-protrusions per 1 mm$^2$, the micro-protrusions protruding in a tapered manner toward outwardly of the tire, wherein
the micro-protrusions comprise first protrusions having a first taper angle and a second protrusions having a second taper angle greater than the first taper angle.

[Clause 2]
The tire according to clause 1, wherein
the first protrusions have a first protrusion height,
the second protrusions have a second protrusion height, and
the first protrusion height is greater than the second protrusion height.

[Clause 3]
The tire according to clause 1 or 2, wherein
a difference between the first taper angle and the second taper angle is in a range of 10 to 90 degrees.

[Clause 4]
The tire according to any one of clauses 1 to 3, wherein
the decorative region comprises a first protrusion group where the first protrusions are arranged consecutively.

[Clause 5]
The tire according to clause 4, wherein
an angle of an arrangement direction of the first protrusion group is 30 to 60 degrees with respect to a tire radial direction.

[Clause 6]
The tire according to any one of clauses 1 to 5, wherein
the decorative region comprises a second protrusion group where the second protrusions are arranged consecutively.

[Clause 7]
The tire according to any one of clauses 1 to 6, wherein
the first protrusions each comprise a top portion being a flat surface.

[Clause 8]
The tire according to any one of clauses 1 to 7, wherein
the second protrusions each comprise a top portion being a hemispherical surface convex outwardly of the tire.

[Clause 9]
The tire according to any one of clauses 1 to 8, wherein
a total number of the first protrusions is 1.2 to 2.5 times a total number of the second protrusions.

[Clause 10]
The tire according to any one of clauses 1 to 9, wherein
the micro-protrusions comprise a base portion extending outwardly of the tire, and
in at least one of the second protrusions, the base portion comprises an inclined surface defining the second taper angle and at least one bump protruding from the inclined surface.

[Clause 11]
The tire according to clause 10, wherein
in the at least one of the second protrusions, the at least one bump comprises a plurality of bumps.

[Clause 12]
The tire according to clause 10 or 11, wherein
the at least one bump elongates along a generating line of the inclined surface.

[Clause 13]
A tire comprising:
a visible outer surface being provided with a decorative region at least partially,
the decorative region having 2 to 10 micro-protrusions per 1 mm$^2$,
the micro-protrusions each having a circularly extending bottom edge, a bottom area surrounded by the bottom edge in a top view of the micro-protrusion, an apex at the position farthest from the bottom edge, and a protrusion height from the bottom edge to the apex, wherein
the micro-protrusions comprise
first protrusions having a first bottom area and a first protrusion height and
second protrusions having a second bottom area and a second protruding height,
the second bottom area is greater than the first bottom area, and
the second protrusion height is smaller than the first protrusion height.

[Clause 14]
The tire according to clause 13, wherein
the first protrusions extend outwardly of the tire in a tapered manner, and
the second protrusions each comprise
a base portion extending outwardly of the tire from the bottom edge and having a dome-shaped outer surface, and
a top portion protruding further from the outer surface of the base portion.

[Clause 15]
The tire according to clause 13, wherein
the first protrusions extend outwardly of the tire in a tapered manner, and
the second protrusions, as a whole, consists of a base portion extending outwardly of the tire from the bottom edge and having a dome-shaped outer surface.

[Clause 16]
The tire according to any one of clauses 13 to 15, wherein
the decorative region comprises
a first protrusion group where the first protrusions are arranged consecutively, and a second protrusion group where the second protrusions are arranged consecutively.

[Clause 17]
The tire according to clause 16, wherein
the first protrusion group and the second protrusion group are arranged alternately in a tire circumferential direction.

[Clause 18]
The tire according to any one of clauses 13 to 15, wherein
the decorative region comprises a decorative pattern where a plurality of the first protrusions is arranged so as to surround one of the second protrusions.

[Clause 19]
The tire according to any one of clauses 13 to 18, wherein
the second bottom area of the second protrusions is in a range of from 1.1 to 2.5 times of the first bottom area of the first protrusions.

[Clause 20]
The tire according to any one of clauses 13 to 19, wherein
the first protrusion height of the first protrusions is in a range of 1.4 to 5.0 times of the second protrusion height of the second protrusions.

What is claimed is:
1. A tire comprising:
a visible outer surface being provided with a decorative region at least partially,
the decorative region having 2 to 10 micro-protrusions per 1 mm$^2$,
the micro-protrusions protruding in a tapered manner outwardly of the tire, wherein
the micro-protrusions comprise first protrusions having a conical shape with a first taper angle and second protrusions having a conical shape with a second taper angle greater than the first taper angle, the first protrusions each comprise a top portion being a flat surface, and the second protrusions each comprise a top portion being a hemispherical surface convex outwardly of the tire.

2. The tire according to claim 1, wherein
the first protrusions have a first protrusion height,
the second protrusions have a second protrusion height, and
the first protrusion height is greater than the second protrusion height.

3. The tire according to claim 1, wherein
a difference between the first taper angle and the second taper angle is in a range of 10 to 90 degrees.

4. The tire according to claim 1, wherein
the decorative region comprises a first protrusion group where the first protrusions are arranged consecutively.

5. The tire according to claim 4, wherein
an angle of an arrangement direction of the first protrusion group is 30 to 60 degrees with respect to a tire radial direction.

6. The tire according to claim 1, wherein
the decorative region comprises a second protrusion group where the second protrusions are arranged consecutively.

7. The tire according to claim 1, wherein
a total number of the first protrusions is 1.2 to 2.5 times a total number of the second protrusions.

8. The tire according to claim 1, wherein
the micro-protrusions comprise a base portion extending outwardly of the tire, and
in at least one of the second protrusions, the base portion comprises an inclined surface defining the second taper angle, and at least one bump protruding from the inclined surface.

9. The tire according to claim 8, wherein
in the at least one of the second protrusions, the at least one bump comprises a plurality of bumps.

10. The tire according to claim 8, wherein
the at least one bump elongates along a generating line of the inclined surface.

11. The tire according to claim 1, wherein a maximum diameter (d1) of the top portion of at least one of the first protrusions is the same as a maximum diameter (d2) of the top portion of at least one of the second protrusions.

12. A tire comprising:
a visible outer surface being provided with a decorative region at least partially,
the decorative region having 2 to 10 micro-protrusions per 1 mm$^2$,
the micro-protrusions each having a circularly extending bottom edge, a bottom area surrounded by the bottom edge in a top view of the micro-protrusion, an apex at the position farthest from the bottom edge, and a protrusion height from the bottom edge to the apex, wherein the micro-protrusions comprise
first protrusions having a conical shape with a first bottom area and a first protrusion height and
second protrusions having a conical shape with a second bottom area and a second protruding height,
the first protrusions each comprise a top portion being a flat surface,
the second protrusions each comprise a top portion being a hemispherical surface convex outwardly of the tire,
the second bottom area is greater than the first bottom area, and
the second protrusion height is smaller than the first protrusion height.

13. The tire according to claim 12, wherein
the first protrusions extend outwardly of the tire in a tapered manner, and
the second protrusions each comprise
a base portion extending outwardly of the tire from the bottom edge and having a dome-shaped outer surface, and
the top portion protruding further from the outer surface of the base portion.

14. The tire according to claim 12, wherein
the first protrusions extend outwardly of the tire in a tapered manner, and
the second protrusions, as a whole, consists of a base portion extending outwardly of the tire from the bottom edge and having a dome-shaped outer surface.

15. The tire according to claim 12, wherein
the decorative region comprises
a first protrusion group where the first protrusions are arranged consecutively, and a second protrusion group where the second protrusions are arranged consecutively.

16. The tire according to claim 15, wherein
the first protrusion group and the second protrusion group are arranged alternately in a tire circumferential direction.

17. The tire according to claim 12, wherein
the decorative region comprises a decorative pattern where a plurality of the first protrusions is arranged so as to surround one of the second protrusions.

18. The tire according to claim 12, wherein
the second bottom area of the second protrusions is in a range of from 1.1 to 2.5 times the first bottom area of the first protrusions.

19. The tire according to claim 12, wherein
the first protrusion height of the first protrusions is in a range of 1.4 to 5.0 times the second protrusion height of the second protrusions.

20. The tire according to claim 12, wherein a maximum diameter (d1) of the top portion of at least one of the first protrusions is the same as a maximum diameter (d2) of the top portion of at least one of the second protrusions.

* * * * *